United States Patent Office 3,423,445
Patented Jan. 21, 1969

3,423,445
PENTAHALOPHENYLETHYLSILANES AND SILOXANES
George W. Holbrook and Ogden R. Pierce, Midland, Mich., assignors to Dow Corning Corporation, Midland, Mich., a corporation of Michigan
No Drawing. Filed May 21, 1965, Ser. No. 457,822
U.S. Cl. 260—448.2          10 Claims
Int. Cl. C07f 7/02, 7/04, 7/18

---

ABSTRACT OF THE DISCLOSURE

Monomers, homopolymers and copolymers or organosilicon compounds of the formula

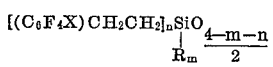

are disclosed. Illustrative of this class of compounds is

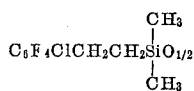

The novel compounds have utility as coating compounds, holding compounds, lubricants, and as ingredients in silicone elastomer stocks.

---

This application relates to new organopolysiloxane fluids, resins, and elastomers which exhibit superior thermal stability, and which have utility as coating compounds, molding compounds, lubricants, and as ingredients in silicone elastomer stocks.

The organosilicon compounds of this invention comprise at least one

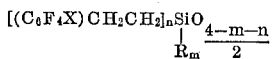

unit, where X is chlorine, bromine or fluorine, R is any monovalent hydrocarbon, monovalent halohydrocarbon other than $C_6F_4XCH_2CH_2$—, divalent hydrocarbon or halohydrocarbon radical having both valences bonded to silicon atoms, monovalent cyanoalkyl, monovalent mercaptoalkyl, monovalent aminoalkyl, monovalent alkylene ester, monovalent alkylether, hydrolyzable, hydrogen, or hydroxyl radical, $n$ is an integer of 1 to 4, and $m$ is an integer of 0 to 3.

R can be any monovalent hydrocarbon radical, e.g., alkyl and cycloalkyl radicals such as methyl, isopropyl, sec-hexyl, octyl, octadecyl, and cyclohexyl; aliphatically unsaturated radicals such as vinyl, ethynyl, allyl, cyclopentenyl, and 3-octenyl; and aryl-containing radicals such as phenyl, tolyl, benzyl, xenyl, or naphthyl.

R can also be any monovalent halohydrocarbon radical such as 3,3,3-trifluoropropyl, 4,5-dichlorooctyl, bromocyclohexenyl, 3-chloroallyl, dibromophenyl, α,α,α-trifluorotolyl, and fluoroxenyl; any monovalent cyanoalkyl radical such as cyanomethyl, gamma-cyanopropyl, 3-cyanocyclohexyl, β-cyanooctyl, and gamma-cyanoisobutyl; any monovalent mercaptoalkyl radical such as mercaptomethyl, β-mercaptoethyl, gamma-mercaptopropyl, gamma-mercaptoisobutyl, 3-mercaptocyclohexyl, and delta-mercaptodecyl; any monovalent aminoalkyl radical such as gamma-aminopropyl, gamma-aminoisobutyl, 2-amino-cyclopentyl, aminohexyl, —$CH_2CH_2CH_2NHCH_2CH_2NH_2$,

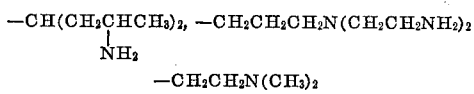

—$CH_2CH_2N(CH_3)_2$ and —$C(CH_2CH_2CH_2NH_2)_3$; any monovalent alkylene ester radical such as

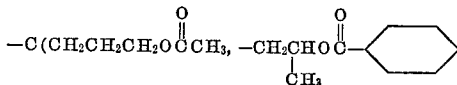

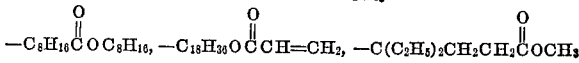

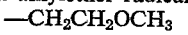

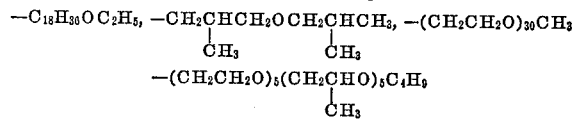

and any monovalent alkylether radical such as

—$CH_2CH_2OCH_3$

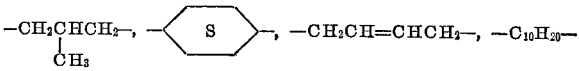

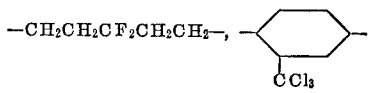

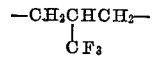

and —$CH_2CH_2OCH_2CH_2OCH_3$.

By "alkylene ester radical" is meant any radical of the formula —ZAZ′, where Z is an alkylene radical, A is a carboxyl linkage, and Z′ is a monovalent hydrocarbon radical or a monovalent alkylether radical.

By "alkylether radical" is meant any alkyl-endblocked radical containing at least one ether linkage and at least one alkylene radical.

By "aminoalkyl radical" is meant any monovalent radical consisting of at least one alkylene radical and at least one amino group.

R can further be any divalent hydrocarbon or halohydrocarbon radical, e.g., methylene, dimethylene,

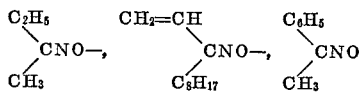

phenylene,

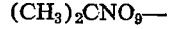

and

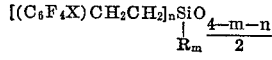

Both valences are bonded to silicon atoms, for example ≡$SiCH_2CH_2Si$≡.

R can also be any hydrolyzable group, i.e., and siliconbonded radical that reacts with water to form a silanol group. Examples are halogens such as chlorine and bromine; alkoxy groups such as methoxy, ethoxy, beta-chloroethoxy, isopropoxy, and hexoxy; alkoxyalkoxy groups such as beta-ethoxyethoxy, beta-methoxyethoxy, and beta-methoxypropoxy; acyloxy groups such as formate, acetate, trifluoroacetate and butyrate; ketoxime derivatives such as

and $(CH_3)_2CNO_9$— amino groups such as —$NH_2$, methylamino, dimethylamino and oxyamino radicals such as —$ON(CH_3)_2$, etc., and the isocyanate radical.

More specifically, this application relates to an organosilicon compound consisting essentially of at least one unit of the formula $$[(C_6F_4X)CH_2CH_2]_nSiO_{\frac{4-m-n}{2}}$$
$$R_m$$

any other units present being of the formula $$R'_xSiO_{\frac{4-x}{2}}$$

where X is selected from the group consisting of chlorine, fluorine and bromine, R is selected from the group consisting of monovalent hydrocarbon, monovalent halohydrocarbon other than $C_6F_4XCH_2CH_2-$, divalent hydrocarbon or halohydrocarbon radicals having both valences bonded to silicon atoms, monovalent cyanoalkyl, monovalent mercaptoalkyl, monovalent aminoalkyl, monovalent alkylene ester, monovalent alkyl ether, hydrolyzable, hydrogen, and hydroxyl radicals, $m$ is an integer of 0 to 3, $n$ is an integer of 1 to 4, R' is selected from the group consisting of monovalent hydrocarbon, monovalent halohydrocarbon, monovalent cyanoalkyl, monovalent mercaptoalkyl, monovalent alkylene ester, monovalent alkyl ether, hydroxyl, hydrogen, and monovalent aminoalkyl radicals, and $x$ is an integer of 0 to 3.

Examples of the classes of R' are listed above.

The compositions of this invention can be silanes, such as $C_6F_5CH_2CH_2Si(OCH_3)_3$,

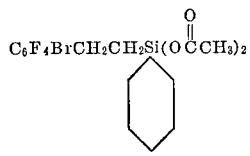

or

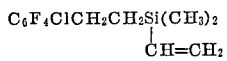

They can also be homopolymers such as

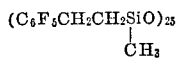

and copolymers such as

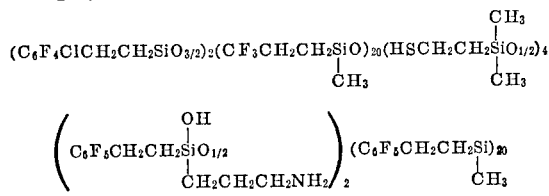

or

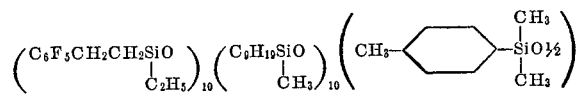

The compounds of this invention can be made in a number of ways. One method is to react $C_6F_5CH=CH_2$, $C_6F_4BrCH=CH_2$, or $C_6F_4ClCH=CH_2$ with an $\equiv SiH$ compound at elevated temperatures in the presence of chloroplatinic acid.

Another method is to react pentafluorobenzene, tetrafluorobromobenzene, or tetrafluorochlorobenzene with an $\equiv SiCH=CH_2$ compound at elevated temperatures in the presence of $AlCl_3$.

Pentafluorobenzene and pentafluorostyrene are commercially available. Tetrafluorochlorobenzene is known to the art, and a method for making tetrafluorobromobenzene is disclosed in the copending U.S. patent application No. 396,391, filed Sept. 14, 1964.

Also, the polysiloxanes of this invention can be prepared by hydrolysis of the appropriate silanes of this invention by any of the well-known techniques for hydrolysis.

The following examples are illustrative only and should not be construed as limiting the invention, which is properly delineated in the appended claims.

Example 1

(a) 38.8 g. of pentafluorostyrene and 0.004 g. of chloroplatinic acid which was dissolved in 0.04 cc. of isopropanol were mixed and heated to 80° C. To this, 23.6 g. of dimethylchlorosilane were added dropwise, and the mixture was heated at 55° to 60° C. for 2 hours. An additional 0.04 cc. of the chloroplatinic acid solution was then added, and the mixture was further heated at 55° to 60° C. for another 8 hours.

Fractionation yielded liquid $C_6F_5CH_2CH_2Si(CH_3)_2Cl$ (B.P. 103–104 at 11 mm.; $n_D^{25}$ 1.4440) in 47.8% yield.

(b) 28.9 g. of this product were dissolved in 50 ml. of diethylether and added with stirring to an equal weight mixture of water and diethylether.

The ether phase was then washed with water until neutral, and then it was freed of water and ether.

The product was mixed with 0.25 g. of sodium hydroxide, and distilled at reduced pressure.

$[C_6F_5CH_2CH_2Si(CH_3)_2]_2O$ was recovered in nearly a quantitative yield (B.P. 150–151° C. at 4.0 mm.; $n_D^{25}$ 1.4430).

Example 2

38.8 g. of pentafluorostyrene and 0.004 g. of chloroplatinic acid which was dissolved in 0.04 cc. of isopropanol were mixed and heated to 100° C.. 33.9 g. of trichlorosilane were added dropwise to the solution. An exothermic reaction took place. The reaction temperature was maintained at 110° to 130° C. by controlling the trichlorosilane addition rate.

At the end of the reaction, fractionation yielded an 84% yield of liquid $C_6F_5CH_2CH_2SiCl_3$ (B.P. 109–110° C. at 15 mm.; $n_D^{25}$ 1.4575).

19.6 g. of $C_6F_5CH_2CH_2SiCl_3$ were dissolved in 75 ml. of diethylether and added with stirring to 26 g. of water. The ether phase was washed until neutral with water.

A film of the resulting silane hydrolyzate was cast onto an infrared spectroscopic prism by applying the ether phase to the prism and allowing the ether to evaporate.

The treated prism was heated for 100 hours at 200° C. and then heated for 150 hours at 250° C. with periodic infrared measurements being taken.

It was determined that the film first lost $\equiv SiOH$ bonds and gained $\equiv SiOSi\equiv$ bonds as condensation went to completion. Following that, the disintegration of the film proceeded with an uniform decrease in the number of all bonds present, indicating slow evaporation of the film, but there was no marked deterioration in the film that remained, and no marked cleavage of any particular bond.

The extrapolated life of a 1/1000 inch film of the condensate was estimated to be about 10,000 hours at 250° C.

Example 3

55.4 g. of chlorotetrafluorobenzene were vigorously stirred with a few grams of $AlCl_3$. 24.2 g. of vinyltrichlorosilane were then added in a dropwise manner with stirring, and the mixture was heated with stirring for 4½ hours.

Distillation yielded 8 g. of a product with a boiling point of 142° to 145° C. at 18 mm. of pressure. The major component of the distillate was

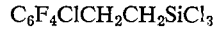

Example 4

(a) The experiment of Example 1(a) was repeated, substituting methyldichlorosilane for dimethylchlorosilane. The product was

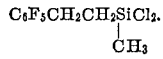

(b) 15 molar parts of the above were cohydrolyzed with 10 molar parts of trimethylchlorosilane and 75 molar parts of dimethyldichlorosilane to form a fluid having a viscosity of 46.3 cs. at 25° C.

(c) 15 molar parts of the product of (a) above were cohydrolyzed with 10 molar parts of trimethylchlorosilane, and 5 molar parts of dichlorophenyltrichlorosilane to form a fluid having a viscosity of 74.8 cs. at 25° C.

(d) 2 mls. each of fluids (b) and (c) above were placed in separate 20 ml. beakers, 2 mls. of a trimethylsiloxy-endblocked dimethylpolysiloxane having a viscosity of 116 cs. at 25° C. were placed in a third 20 ml. beaker.

The beakers were heated at 250° C., and the time required until the fluids gelled was recorded.

Fluid: Gel time, hrs.
- Dimethylpolysiloxane _____ 16 to 24
- (b) _____ 48 to 56
- (c) _____ 64 to 72

(e) Both (a) and (b) showed superiority over both dimethylpolysiloxane and a commercial dichlorophenyl-phenyl-methylpolysiloxane lubricant as high speed ball bearing lubricants, in that less scarring of the ball bearings occurred when (a) or (b) were used.

Example 5

When 5 g. of tetrafluorochlorostyrene and 0.1 g. of a chloroplatinic acid complex with cyclohexene are reacted at 80° C. with 3 g. of

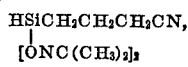
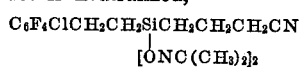

and the product is neutralized, $C_6F_4ClCH_2CH_2SiCH_2CH_2CH_2CN$
$[ONC(CH_3)_3]_2$ is recovered.

Example 6

When 1 g. of tetrafluorobromostyrene, 2 g. of octadecene-1, and 0.01 g. of chloroplatinic acid complex with ethylene, are reacted with 0.5 g. of

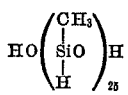

at 50° C., a silanol-endblocked product containing

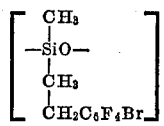

units

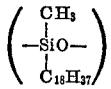

units and

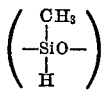

units is formed.

Example 7

When 1 g. of pentafluorostyrene is reacted with 0.8 g. of

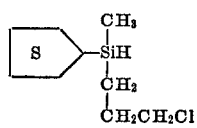

in the presence of a trace of chloroplatinic acid, the compound

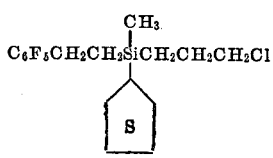

is formed.

Example 8

When 1 g. of tetrafluorochlorostyrene is reacted with 1 g. of

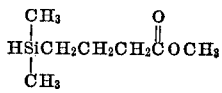

by heating the mixture in the presence of platinized carbon, the product

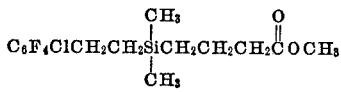

is formed.

Example 9

When 1 g. of pentafluorostyrene is reacted with 5 g. of

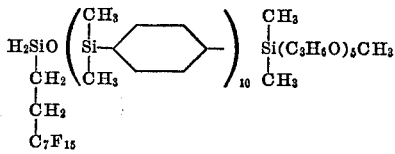

in the presence of chloroplatinic acid by heating at 100° C., the product

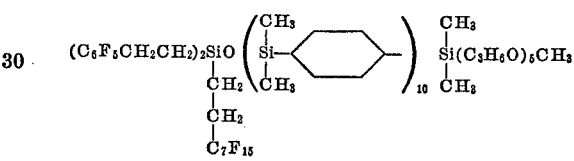

is formed.

Example 10

When 1 g. of $SiCl_4$, 1 g. of magnesium powder, and 5 g. of $C_6F_5CH_2CH_2Cl$ are heated at 150° C., the product $Si(CH_2CH_2C_6F_5)_4$ is formed.

That which is claimed is:

1. An organosilicon compound of the unit formula

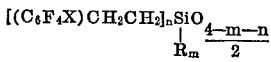

where X is chlorine, bromine or fluorine, R is any monovalent hydrocarbon, monovalent halohydrocarbon other than $C_6F_4XCH_2CH_2$—, divalent hydrocarbon or halohydrocarbon radical having both valences bonded to silicon atoms, monovalent cyanoalkyl, monovalent mercaptoalkyl, monovalent aminoalkyl, monovalent alkylene ester, monovalent alkylether, hydrolyzable hydrogen, or hydroxyl radical, $n$ is an integer of 1 to 4, and $m$ is an integer of 0 to 3.

2. An organosilicon compound consisting essentially of at least one unit of the formula

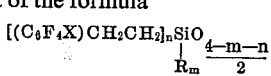

the remaining units present being of the formula

where X is selected from the group consisting of chlorine, fluorine and bromine, R is selected from the group consisting of monovalent hydrocarbon, monovalent halohydrocarbon other than $C_6F_4XCH_2CH_2$—, divalent hydrocarbon or halohydrocarbon radicals having both valences bonded to silicon atoms, monovalent cyanoalkyl, monovalent mercaptoalkyl, monovalent aminoalkyl, monovalent alkylene ester, monovalent alkyl ether, hydrolyzable, hydrogen, and hydroxyl radicals, $m$ is an integer of 0 to 3, $n$ is an integer of 1 to 4, R' is selected from the group consisting of monovalent hydrocarbon, monovalent halohydrocarbon, monovalent cyanoalkyl, monovalent mercaptoalkyl, monovalent alkylene ester, monovalent alkyl ether, hydroxyl, hydrogen, and monovalent aminoalkyl radicals, and $x$ is an integer of 0 to 3.

3. The compound of claim 2 where X is fluorine.
4. $C_6F_5CH_2CH_2SiCl_3$.
5. $C_6F_5CH_2CH_2Si(CH_3)_2Cl$.
6. $C_6F_4ClCH_2CH_2SiCl_3$.
7.

$$C_6F_5CH_2CH_2\overset{\overset{\displaystyle CH_3}{|}}{Si}OCl_2$$

8. A polymer of $$C_6F_5CH_2\overset{\overset{\displaystyle CH_3}{|}}{Si}O$$

$(CH_3)_2SiO$, and $(CH_3)_3SiO_{1/2}$ units.

9. A polymer of $$C_6F_5CH_2CH_2\overset{\overset{\displaystyle CH_2}{|}}{Si}Cl_3$$

$(CH_3)_2SiO$, $C_6H_3Cl_2SiO_{3/2}$ and $(CH_3)_3SiO_{1/2}$ units.

10. A homopolymer of $$C_6F_5CH_2CH_2\overset{\overset{\displaystyle CH_3}{|}}{Si}O$$

units.

References Cited
UNITED STATES PATENTS

| | | | |
|---|---|---|---|
| 2,911,427 | 11/1959 | Brown | 260—448.2 |
| 2,911,428 | 11/1959 | Tarrant | 260—448.2 |
| 3,109,855 | 11/1963 | Pummer et al. | 260—448.2 |
| 3,122,521 | 2/1964 | Pierce | 260—448.2 X |
| 3,269,928 | 8/1966 | Haszeldine et al. | 260—448.2 X |
| 3,270,070 | 8/1966 | Haszeldine et al. | 260—448.2 X |

HELEN M. McCARTHY, *Primary Examiner.*

PAUL F. SHAVER, *Assistant Examiner.*

U.S. Cl. X.R.

260—448.8, 46.5; 252—49.6.

UNITED STATES PATENT OFFICE
CERTIFICATE OF CORRECTION

Patent No. 3,423,445                  January 21, 1969

George W. Holbrook et al.

It is certified that error appears in the above identified patent and that said Letters Patent are hereby corrected as shown below:

Column 2, lines 3 and 4, the first formula should appear as shown below:

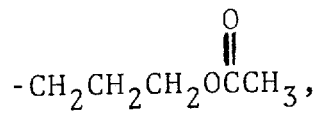

same column 2, lines 9 and 10, the first formula should appear as shown below:

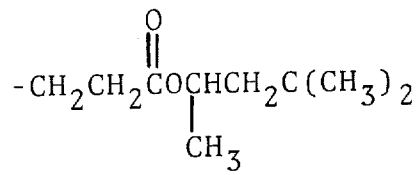

Column 3, lines 39 to 42, the formula should appear as shown below:

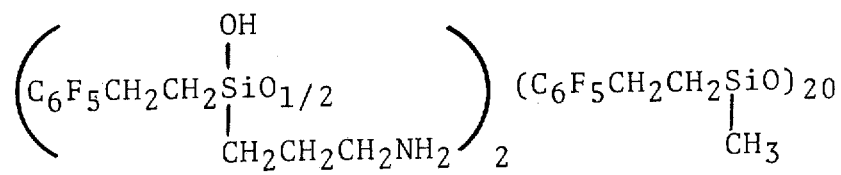

same column 3, lines 44 to 47, the formula should appear as shown below:

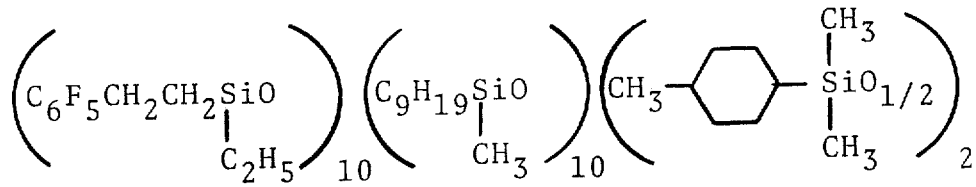

3,423,445

(2)

Column 7, lines 12 to 14, the formula should appear as shown below:

$$C_6F_5CH_2CH_2\underset{\underset{\displaystyle }{|}}{\overset{\overset{\displaystyle CH_3}{|}}{Si}}O$$

Signed and sealed this 28th day of April 1970.

(SEAL)
Attest:

EDWARD M. FLETCHER, JR.
Attesting Officer

WILLIAM E. SCHUYLER, JR.
Commissioner of Patents